US012715481B2

(12) United States Patent
Harasaki

(10) Patent No.: US 12,715,481 B2
(45) Date of Patent: Aug. 25, 2026

(54) TRANSPORT SYSTEM

(71) Applicant: Murata Machinery, Ltd., Kyoto (JP)

(72) Inventor: Kazumi Harasaki, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 87 days.

(21) Appl. No.: 18/726,663

(22) PCT Filed: Sep. 1, 2022

(86) PCT No.: PCT/JP2022/032986
§ 371 (c)(1),
(2) Date: Jul. 3, 2024

(87) PCT Pub. No.: WO2023/132101
PCT Pub. Date: Jul. 13, 2023

(65) Prior Publication Data

US 2025/0083710 A1 Mar. 13, 2025

(30) Foreign Application Priority Data

Jan. 7, 2022 (JP) ................................ 2022-001966

(51) Int. Cl.
*B61B 3/02* (2006.01)
*G05D 1/644* (2024.01)
*G05D 1/646* (2024.01)
*G05D 1/69* (2024.01)
*G05D 107/70* (2024.01)

(52) U.S. Cl.
CPC ............... *B61B 3/02* (2013.01); *G05D 1/644* (2024.01); *G05D 1/646* (2024.01); *G05D 1/69* (2024.01); *G05D 2107/70* (2024.01)

(58) Field of Classification Search
CPC ...... G05D 2107/70; G05D 1/69; G05D 1/646; G05D 1/644; B61B 3/02
USPC ........................................................ 701/23
See application file for complete search history.

(56) References Cited

U.S. PATENT DOCUMENTS

2010/0242783 A1* 9/2010 Oguro ............... H01L 21/67727 104/91
2017/0169373 A1* 6/2017 Roulland ......... G06Q 10/06313
2021/0139250 A1* 5/2021 Kono ..................... B65G 35/06
(Continued)

FOREIGN PATENT DOCUMENTS

JP 2009025184 A 2/2009
JP 2020030723 A 2/2020
JP 2021-076970 A 5/2021

*Primary Examiner* — Yazan A Soofi
(74) *Attorney, Agent, or Firm* — Keating & Bennett, LLP

(57) ABSTRACT

A transport system includes a transport vehicle to travel along a trajectory to transport an article, and a management controller configured or programmed to assign a transport command of the article to the transport vehicle and to include a route selector to select based on the transport command a route on which the transport vehicle travels such that a cost of the route from a departure point to a destination is reduced or minimized, a counter to count a number of transport vehicles entering a setting area in the trajectory, and an adjuster to increase the cost of the route passing through the setting area when a count aggregation value in which the number counted by the counter in an aggregation period is aggregated exceeds a first threshold.

7 Claims, 6 Drawing Sheets

(56) References Cited

U.S. PATENT DOCUMENTS

| | | | | |
|---|---|---|---|---|
| 2022/0187847 | A1* | 6/2022 | Cella | G05B 19/41885 |
| 2022/0384229 | A1* | 12/2022 | Kitamura | G05D 1/692 |
| 2023/0083724 | A1* | 3/2023 | Cella | G06F 16/24537 705/28 |

* cited by examiner

| Connection Area | |
| --- | --- |
| Processing Area | |

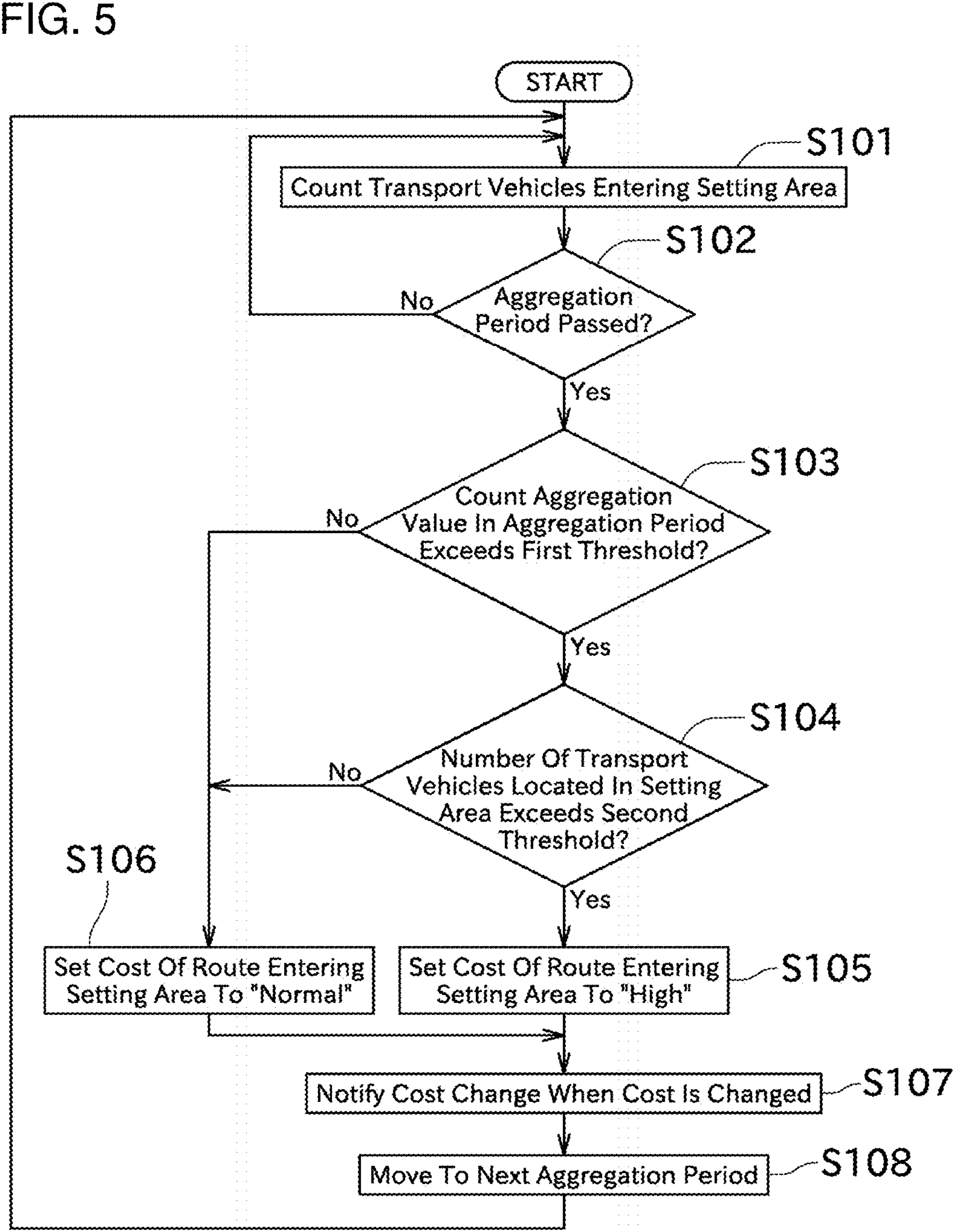
FIG. 5
START
S101
Count Transport Vehicles Entering Setting Area
S102
Aggregation Period Passed?
No
Yes
S103
Count Aggregation Value In Aggregation Period Exceeds First Threshold?
No
Yes
S104
Number Of Transport Vehicles Located In Setting Area Exceeds Second Threshold?
No
Yes
S106
Set Cost Of Route Entering Setting Area To "Normal"
Set Cost Of Route Entering Setting Area To "High"
S105
Notify Cost Change When Cost Is Changed
S107
Move To Next Aggregation Period
S108

TRANSPORT SYSTEM

BACKGROUND OF THE INVENTION

1. Field of the Invention

The present invention mainly relates to transport systems each including a transport vehicle and a control device.

2. Description of the Related Art

Japanese Patent Application Laid-Open No. 2021-76970 discloses an article transport facility. The article transport facility includes an article transport vehicle that transports an article and a control device that controls the article transport vehicle. The article transport vehicle can travel along a travel path. The control device determines the travel path of the article transport vehicle based on a link cost. The link cost is a cost that is set for each link forming the travel path. The control device selects a link such that the link cost is low, and sets the travel path of the article transport vehicle. Japanese Patent Application Laid-Open No. 2021-76970 also discloses that the link cost increases depending on the number of other article transport vehicles existing in the link.

SUMMARY OF THE INVENTION

The article transport facility of Japanese Patent Application Laid-Open No. 2021-76970 determines whether to increase the link cost based on a congestion status of each link only at a time of setting a route. However, when it is based on information only at one point in time, the congestion status of the link may be insufficiently estimated. For example, even when the link is congested at one point in time, the congestion may resolve spontaneously. In such a situation, when the link cost is caused to increase, a circuitous route is set. This reduces a transport efficiency.

Example embodiments of the present invention provide transport systems that each accurately determine a congestion status to perform a process in which congestion is reduced.

According to an example embodiment of the present invention, a transport system includes a transport vehicle to travel along a trajectory to transport an article, and a management controller configured or programmed to assign a transport command of the article to the transport vehicle and to include a route selector, a counter, and an adjuster. The route selector selects a route on which the transport vehicle travels based on the transport command, such that a cost of the route from a departure point to a destination is reduced or minimized. The counter counts a number of transport vehicles entering a setting area in the trajectory. The adjuster increases the cost of the route passing through the setting area when a count aggregation value in which the number of the transport vehicles counted by the counter in an aggregation period is aggregated exceeds a first threshold.

The count aggregation value includes data regarding congestion from the past to the point of aggregation, and is therefore an effective indicator regarding occurrence of the congestion of the transport vehicles. Thus, the cost of passing through the route increases based on the count aggregation value, which accurately determines a congestion status and reduces the congestion of the transport vehicles.

In the transport system, the following configuration is preferably provided. That is, the adjuster determines whether the count aggregation value in a first aggregation period exceeds the first threshold, and then determines whether the count aggregation value in a second aggregation period exceeds a threshold. A portion of the first aggregation period and a portion of the second aggregation period overlap temporally.

Accordingly, changes in the congestion status of the transport vehicles can be detected earlier, as compared with when the first aggregation period and the second aggregation period do not overlap temporally.

In the transport system, it is preferable that the adjuster increases the cost of the route passing through the setting area when the count aggregation value exceeds the first threshold and the number of transport vehicles located in the setting area exceeds a second threshold.

Accordingly, a determination can be performed in further consideration of the current congestion status. Therefore, the congestion status can be determined more accurately and the congestion of the transport vehicles can be reduced.

In the transport system, the following configuration is preferably provided. That is, a plurality of setting areas is set. The counter counts the number of transport vehicles entering the setting areas for each setting area.

Thus, the congestion can be reduced in a plurality of locations.

In the transport system, the following configuration is preferably provided. That is, a processor is located along the trajectory. The processor is configured or programmed to process the article transported by the transport vehicle. An area included in the trajectory includes a processing area and a connection area. The processing area is an area where the processor is located. The connection area connects processing areas. The setting area includes at least a portion of the processing area. The counter counts the number of transport vehicles entering the setting area from the connection area.

Since it is assumed that a large number of transport vehicles travel in the connection area, the congestion is likely to occur as the number of transport vehicles entering the setting area from the connection area increases. The counting of the number of transport vehicles can reduce the congestion.

In the transport system, the following configuration is preferably provided. That is, the connection area includes a first track, a second track, a connection path, and a shortcut. The second track is parallel or substantially parallel to the first track. The connection path connects an end of the first track and an end of the second track on the same side. The shortcut is provided separately from the connection path, and connects an intermediate portion of the first track and an intermediate portion of the second track. The setting area includes at least a portion of the processing area closest to the shortcut in a plurality of the processing areas.

Due to the existence of the shortcut, the number of transport vehicles passing through the shortcut increases, resulting in unbalance in the trajectory on which the transport vehicles travel. Accordingly, the congestion is more likely to occur, which effectively utilizes a function of congestion reduction.

In the transport system, the following configuration is preferably provided. That is, the connection area includes an intermediate connection area, a first connection area, and a second connection area. The intermediate connection area includes the first track, the second track, the connection path, and the shortcut. The first connection area is located on a first side, and the second connection area is located on a second side opposite to the first side, with the intermediate connection area interposed therebetween in a plan view. The processing area includes a plurality of first processing areas and a plurality of second processing areas. Each of the first processing areas is connected to the first connection area, and the first track of the intermediate connection area. Each of the second processing areas is connected to the second connection area, and the second track of the intermediate connection area. The setting area includes at least one first processing area closest to the shortcut, and at least one second processing area closest to the shortcut.

Since the transport vehicle traveling from the first connection area to the second connection area mainly passes through the shortcut and the processing areas near the shortcut, the congestion is likely to occur in such processing areas. Therefore, these processing areas are included in the setting area, which can reduce the congestion appropriately.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5 is a flowchart illustrating a process in which the congestion is determined and reduced.

DETAILED DESCRIPTION OF THE EXAMPLE EMBODIMENTS

Figure 1:
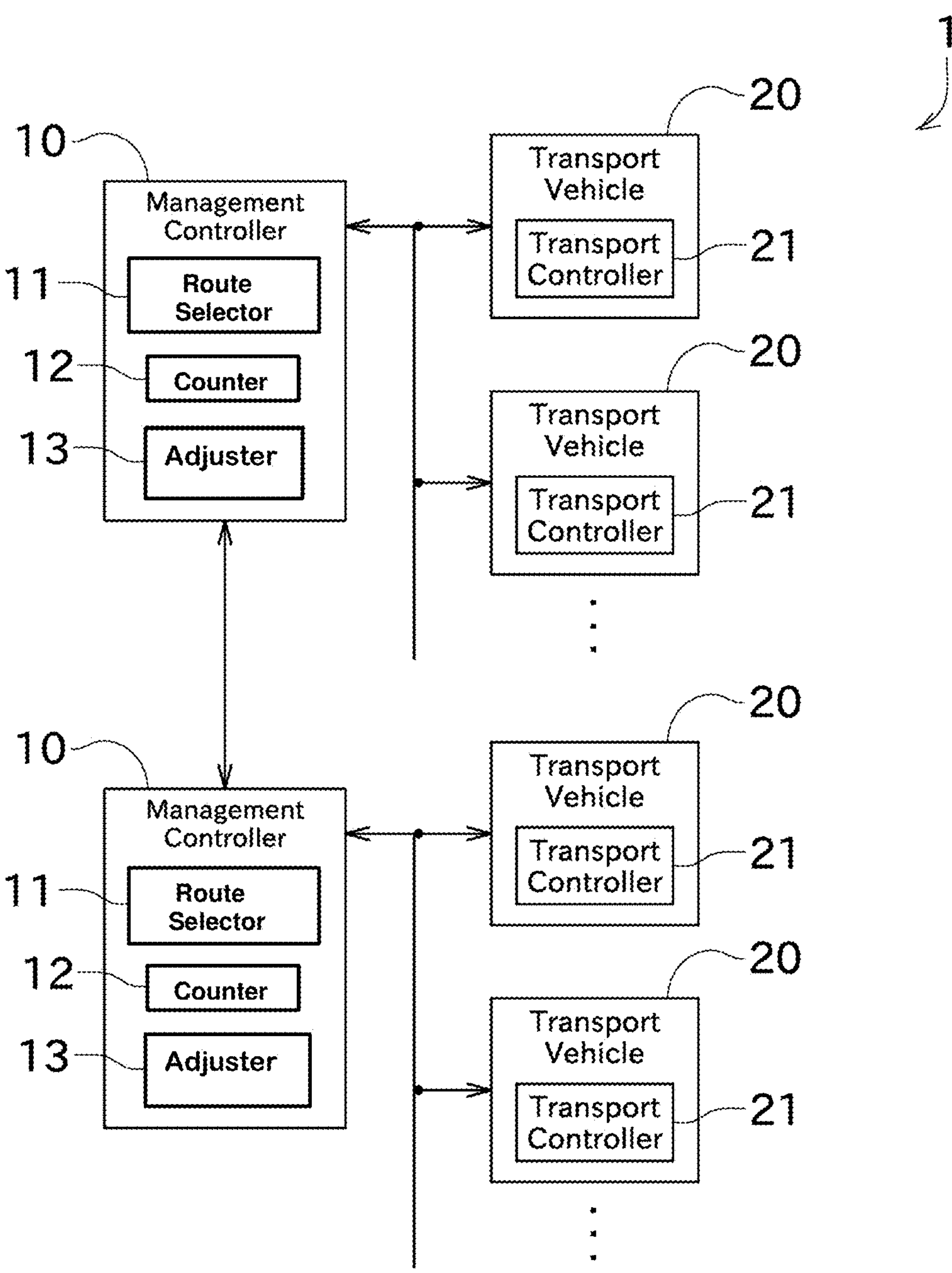
FIG. 1 is a block diagram of a transport system according to an example embodiment of the present invention.

A transport system 1 illustrated in FIG. 1 transports an article, and is provided at facilities such as a semiconductor manufacturing plant or a logistics warehouse. The article transported by the transport system 1 is a container that stores a wafer (a semiconductor wafer). Specifically, the container is a FOUP (Front-Opening Unified Pod) or a wafer cassette. The article may be a reticle pod that stores a reticle. When the transport system 1 is provided at the logistics warehouse, the article is a product, or parts stored in the logistics warehouse.

Figure 2:
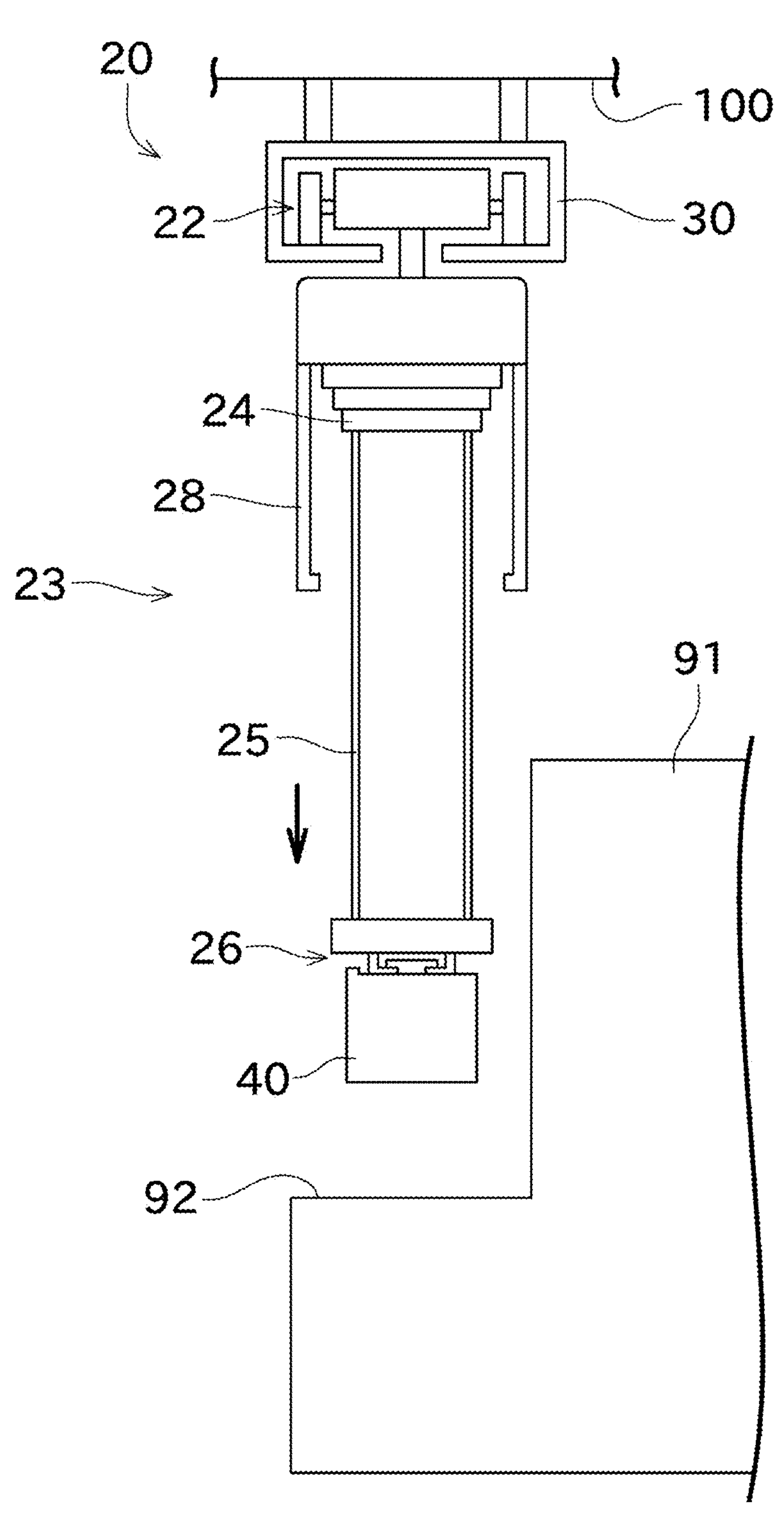
FIG. 2 is a schematic side view illustrating a configuration of a transport vehicle.

As illustrated in FIG. 1 and FIG. 2, the transport system 1 includes management controllers 10, transport vehicles 20, and a trajectory 30.

Each of the management controllers 10 includes a computer having an arithmetic unit such as a CPU, a storage device such as am HDD, a SSD, or a flash memory, and a communication device. Each of the management controllers 10 is configured or programmed to read and execute a program stored in the storage device to execute various controls related to transportation and processes of the article. With cooperation of the above-described hardware and software, the computer can be configured or programmed to operate so as to define and function a route selector 11, a counter 12, and an adjuster 13. These operations will be described later.

Each of the management controllers 10 is capable of transmitting a transport command to the transport vehicle 20 using the communication device. The transport command is a command requesting the transport vehicle 20 to transport the article. The transport command includes, for example, a destination of the article and a destination of the article.

In the present example embodiment, the transport system 1 includes a plurality of management controllers 10. Each of the management controllers 10 is configured or programmed to manage a plurality of transport vehicles 20. Each of the management controllers 10 can communicate wirelessly with the transport vehicles 20 managed by such management controller 10. The transport system 1 may include one management controller 10.

Each of the transport vehicles 20 is an OHT (Overhead Hoist Transfer), for example. Each of the transport vehicles 20 is a vehicle that travels unmanned along the trajectory 30 hanging from a ceiling 100 and performs a transport operation in which the article is transported. The transport system 1 includes a plurality of transport vehicles 20.

A plurality of processors 91 is provided in the semiconductor manufacturing plant. Each of the processors 91 is located in the vicinity of the trajectory 30, and is accessible by the transport vehicle 20 traveling along the trajectory 30.

Each of the processors 91 includes a placement area 92 receiving an article 40 from the transport vehicle 20. The processor 91 takes in the article 40 located on the placement area 92 and performs a process on a wafer stored in the article 40 (for example, a process for manufacturing a semiconductor device). When the transport system 1 is applied to a logistics warehouse or the like, unlike a semiconductor plant, a storage shelf or the like to store the article 40 is provided, instead of the processor 91.

Hereinafter, a detailed configuration of each of the transport vehicles 20 will be further described. As illustrated in FIG. 1 and FIG. 2, each of the transport vehicles 20 includes a transport controller 21, a traveler 22, a transporter 23, and a housing 28.

The transport controller 21 includes a computer including an arithmetic processing unit such as a CPU, a storage device such as am HDD, a SSD, or a flash memory, and a communication device. The transport controller 21 is configured or programmed to read and execute a program stored in the storage device to control each component of each of the transport vehicles 20. The communication device can communicate with the management controller 10 by wire or wirelessly.

The traveler 22 includes a travel motor and wheels. The travel motor generates a rotational driving force based on a control of the transport controller 21. The rotational driving force generated by the travel motor causes the wheels to rotate, so that each of the transport vehicles 20 travels along the trajectory 30.

The transporter 23 includes a winding mechanism 24, a hanging belt 25, and a holder 26. The winding mechanism 24 includes a lifting motor. The winding mechanism 24 can wind or unwind the hanging belt 25 using a driving force generated by the lifting motor. The holder 26 is coupled to a lower end of the hanging belt 25. The holder 26 can switch states between a holding state of the article 40 and a releasing state from the holding state of the article 40.

With such configuration, the hanging belt 25 lowers the article 40 and the holder 26 holds the article 40, so that the article 40 can be received. After the transport vehicle 20 has arrived at a destination, the hanging belt 25 lowers the article 40 and the holder 26 releases holding of the article 40, so that the article 40 can be transported to the placement area 92.

The holder 26 may hold a side surface or a bottom surface of the article 40. The transporter 23 does not need to hold and transport the article 40, and may have a transport table on which the article 40 is located and transported.

Next, a layout of the trajectory 30 of the present example embodiment will be described with reference to FIG. 3.

The trajectory 30 of the present example embodiment is a one-way line, and a traveling direction of the transport vehicle 20 is predetermined. The arrows illustrated in FIG. 3 indicate the traveling direction of the trajectory 30. The trajectory 30 is not limited to the one-way line, and may be a two-way line.

An area formed by the trajectory 30 is divided into a processing area and a connection area. The processing area is an area mainly to process the article 40, and is an area where the processor 91 is located along the trajectory 30. A main purpose of the processing area is required to process the article 40, and the processing area may be used in an auxiliary manner to transport the article 40. The processing area includes a plurality of intrabays. Each of the intrabays is an area where load ports in the plurality of processors 91 are arranged to face each other. The connection area is an area where processing areas are connected to each other and is mainly used to transport the article 40. A main purpose of the connection area is required to transport the article 40, and a small number of processors 91 may be located in the connection area. The connection area includes a plurality of interbays. Each of the interbays includes a revolving trajectory connected to the plurality of intrabays.

Figure 3:
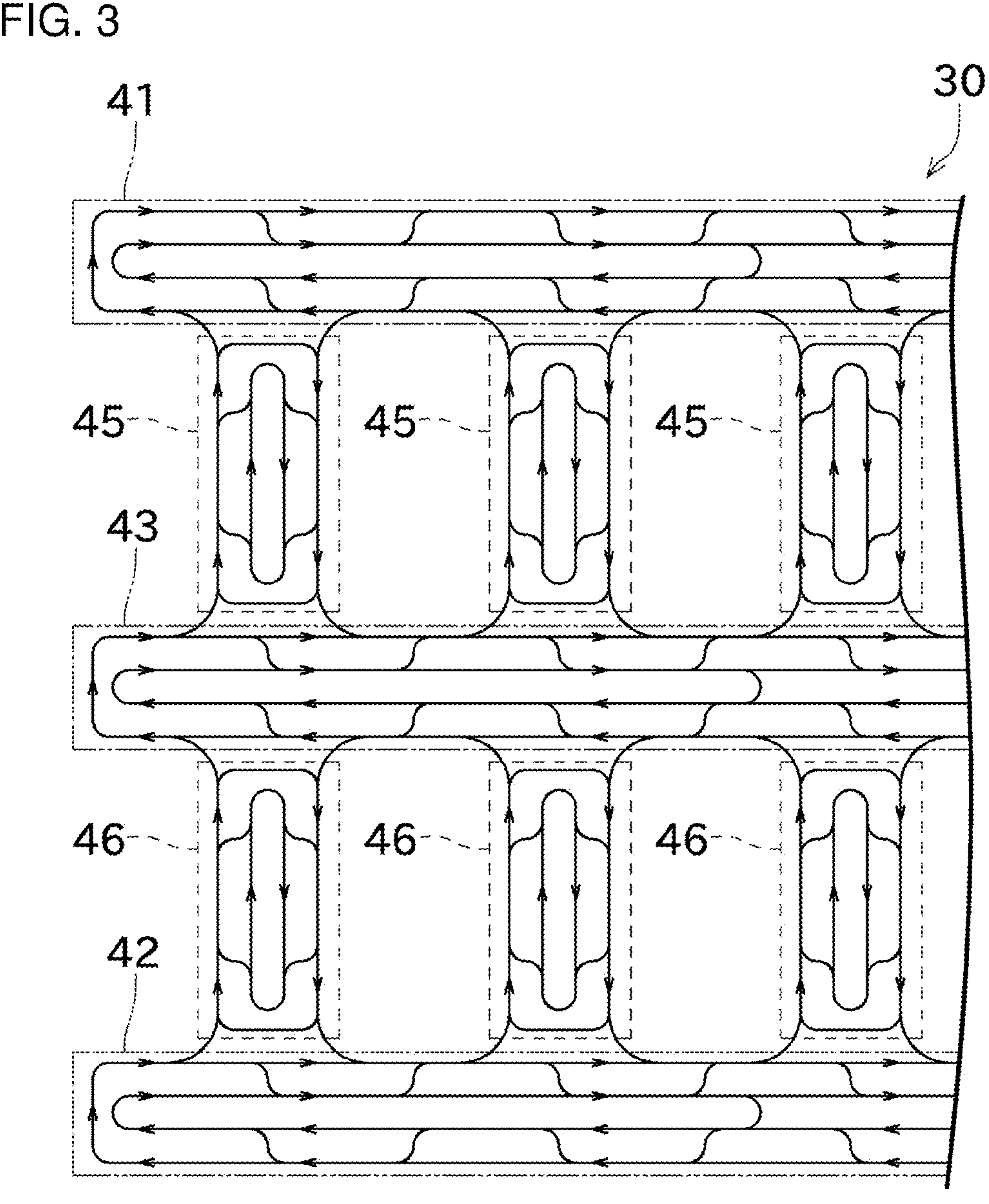
FIG. 3 is a schematic plan view illustrating each of areas included in a trajectory.

As illustrated in FIG. 3, the transport system 1 includes a first connection area 41, a second connection area 42, and an intermediate connection area 43 serving as the connection area. The first connection area 41, the second connection area 42, and the intermediate connection area 43 correspond to the interbays, respectively. In a plan view, the first connection area 41 is located on a first side (upper side in the drawing), and the second connection area 42 is located on a second side (lower side in the drawing) opposite to the first side, with the intermediate connection area 43 interposed therebetween. In the present example embodiment, a distance from the first connection area 41 to the intermediate connection area 43 and a distance from the second connection area 42 to the intermediate connection area 43 are the same, but may be different from each other. The number of connection areas may be one or two, or may be four or more. Longitudinal directions of the first connection area 41, the second connection area 42, and the intermediate connection area 43 are parallel to each other. Alternatively, at least two longitudinal directions of the plurality of connection areas may be perpendicular or substantially perpendicular to each other in the plan view.

As illustrated in FIG. 3, the transport system 1 includes a plurality of first processing areas 45 and a plurality of second processing areas 46, serving as the processing area. The first processing areas 45 and the second processing areas 46 correspond to the intrabays, respectively.

Each of the first processing areas 45 is located between the first connection area 41 and the intermediate connection area 43 in the plan view, and is connected to both the first connection area 41 and the intermediate connection area 43. The first processing areas 45 are arranged side by side on one direction (the longitudinal direction of the first connection area 41, and the like).

Each of the second processing areas 46 is located between the second connection area 42 and the intermediate connection area 43 in the plan view, and is connected to both the second connection area 42 and the intermediate connection area 43. The second processing areas 46 are arranged side by side on one direction (the longitudinal direction of the first connection area 41, and the like). The longitudinal direction of each of the first processing areas 45 and each of the second processing areas 46 is perpendicular or substantially perpendicular to the longitudinal direction of the first connection area 41, and the like.

Next, the intermediate connection area 43 will be described in more detail and the cause of congestion of the transport vehicles 20 will be described, with reference to FIG. 4.

Figure 4:
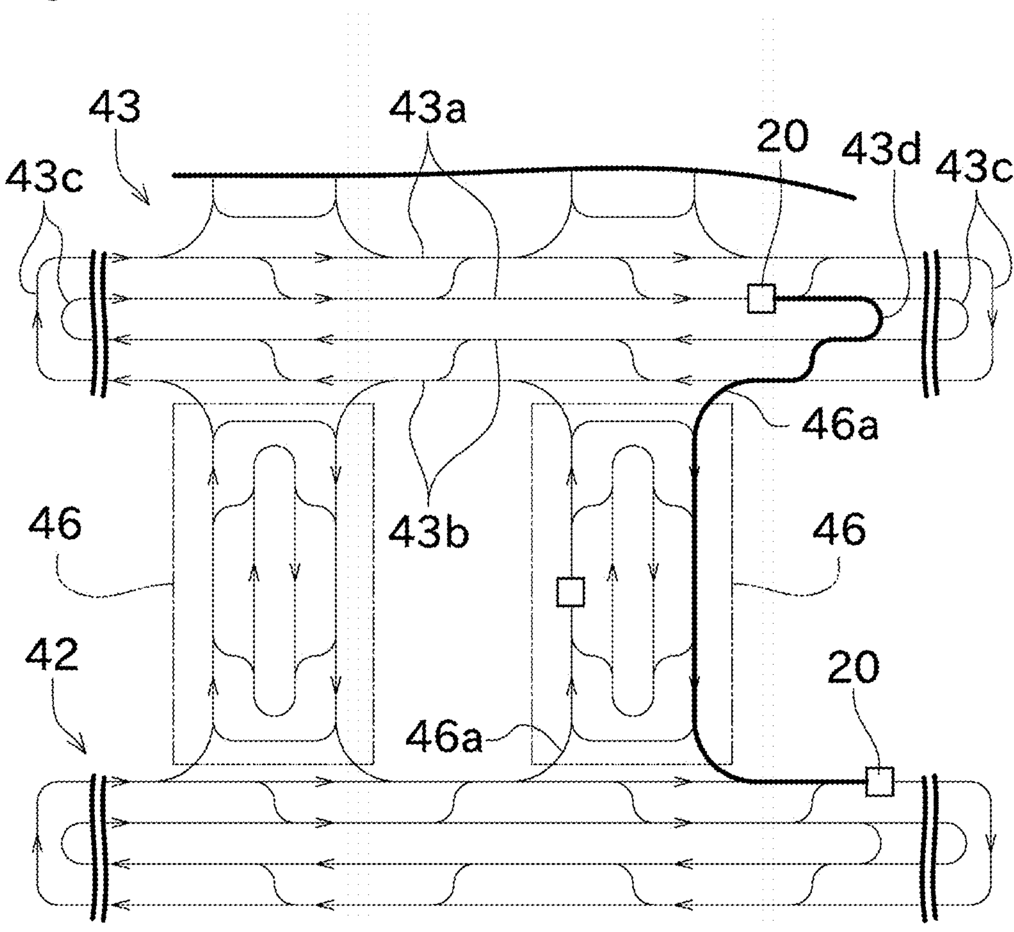
FIG. 4 is a schematic plan view illustrating tracks including an intermediate connection area and processing areas at which congestion is likely to occur.

As illustrated in FIG. 4, the intermediate connection area 43 includes a first track **43*a*, a second track 43*b*, connection paths 43*c*, and a shortcut 43*d***.

The first track **43*a* corresponds to the trajectory 30 along the longitudinal direction of the intermediate connection area 43. The first track 43*a* may include an inclined path or a curved path relative to the longitudinal direction of the intermediate connection area 43. In the first track 43*a* of the present example embodiment, two paths make up one set. The two paths of the first track 43*a* make up one set, so that the article 40 can be transported efficiently. For example, when one of two paths of the first track 43*a* is congested, the transport vehicle 20 avoids congestion by passing through the other of two tracks of the first track 43*a*. This shortens the transport time of the article 40. The second track 43*b* corresponds to the trajectory 30 located parallel to the first track 43*a*. The description regarding the first track 43*a* applies to the second track 43*b*** unless there is inconsistent.

The connection paths **43*c* are located on one side and the other side of the longitudinal direction of the first track 43*a* and the second track 43*b* (on the left side and the right side of FIG. 4). One of the connection paths 43*c* corresponds to the trajectory 30 connecting one end of the first track 43*a* and one end of the second track 43*b* in their longitudinal directions. The other of the connection paths 43*c* corresponds to the trajectory 30 connecting the other end of the first track 43*a* and the other end of the second track 43*b*** in their longitudinal directions.

The shortcut **43*d* corresponds to the trajectory 30 connecting an intermediate portion of the first track 43*a* in its longitudinal direction and an intermediate portion of the second track 43*b* in its longitudinal direction. The shortcut 43*d* is a route to shorten a travel distance of the transport vehicle 20 at a time of transporting the article 40**.

When the transport vehicle 20 moves from the first connection area 41 to the second connection area 42, the transport vehicle 20 passes through the intermediate connection area 43. More specifically, the transport vehicle 20 passes through the first connection area 41, the first processing area 45, the first track **43*a*, the second track 43*b*, and the second processing area 46, and then moves to the second connection area 42. When the transport vehicle 20 moves from the first track 43*a* to the second track 43*b*, the transport vehicle 20 passes through the connection path 43*c* or the shortcut 43*d*. However, the shortcut 43*d* is frequently selected in order to shorten a travel distance of the transport vehicle 20. When the transport vehicle 20 moves from the second connection area 42 to the first connection area 41, the transport vehicle 20** passes through each of the above-described areas or each of the above-described tracks in the reverse order.

Here, the shortcut 43*d* is not located in all the first processing areas 45 (or the second processing areas 46). In other words, a space at which the shortcut 43*d* is located is longer than a space at which the first processing area 45 (or the second processing area 46) is located. Therefore, the transport vehicle 20 moves to the second connection area 42 frequently after passing through the shortcut 43*d* and then passing through a specific second processing area 46 closest to the shortcut 43*d* (for example, the second processing area 46 illustrated on the right side of FIG. 4). As a result, the congestion occurs in the specific second processing area 46, which causes the transport vehicle 20 to stop or move low speed. This reduces transport efficiency. Similarly, when the transport vehicle 20 moves from the second connection area 42 to the first connection area 41, the transport vehicle 20 moves to the first connection area 41 frequently via a specific first processing area 45 closest to the shortcut 43*d*. As a result, the congestion is likely to occur in such a specific first processing area 45.

Next, the congestion determination and reduction process will be described with reference to FIG. 4 to FIG. 7.

Each of the management controllers 10 of the present example embodiment is configured or programmed to manage one first processing area 45 (or one second processing area 46). As described above, each of the management controllers 10 is configured or programmed to manage the transport vehicle 20 within the area in which each of the management controllers 10 manages.

When the article 40 needs to be transported by the transport vehicle 20, each of the management controllers 10 transmits a transport command to the transport vehicle 20 in which each of the management controllers 10 manages. The route selector 11 of each of the management controllers 10 selects a route through which the transport vehicle 20 passes from a departure point to a destination.

Specifically, the route selector 11 selects the route using a cost. Since the route search using the cost has been known, a brief description will follow below. A cost is set for each route. For example, the longer the length of the route, the higher the cost of such route. The cost of a curved route is higher than the cost of a straight route even when the lengths of the routes are the same. The route selector 11 selects a route such that the total cost of the routes passes from the departure point to the destination is reduced or minimized.

In the present example embodiment, a predetermined area is set, and the congestion in the predetermined area is determined. In the following description, such area is referred to as a setting area. In the present example embodiment, all the first processing areas 45 are set as the setting areas, respectively, and all the second processing areas 46 are set as the setting areas, respectively. Only a specific first processing area 45 or only a specific second processing area 46 may be set as the setting area. For example, the first processing area 45 and the second processing area 46 which are closest to the shortcut 43*d* (which are firstly passed after passing through the shortcut 43*d*) may be preferably set as at least the setting area.

Each of the management controllers 10 is configured or programmed to perform a process illustrated in FIG. 5, for the first processing area 45 or the second processing area 46 in which each of the management controllers 10 manages. Firstly, the counter 12 of each of the management controllers 10 counts the transport vehicle 20 entering the setting area (S101). For example, the counter 12 determines that the transport vehicle 20 enters the setting area when the transport vehicle 20 passes through an entering route 46*a* illustrated in FIG. 4. The entering route 46*a* is a route to connect the intermediate connection area 43 and the second processing areas 46. However, counting may be performed based on whether or not the transport vehicle 20 has passed through a predetermined position that is a downstream position of the entering route 46*a*.

The counter 12 detects that the transport vehicle 20 has passed through the entering route 46*a* in various ways. For example, the counter 12 can recognize a position of the transport vehicle 20 managed by the management controller 10, based on control details. The counter 12 can also recognize a position of the transport vehicle 20 managed by another management controller 10, based on a notification from another management controller 10 or an upper control device. Alternatively, a sensor that detects the transport vehicle 20 may be provided on the entering route 46*a*, and the counter 12 may count the transport vehicle 20 that has passed through the entering route 46*a* based on the detection result of the sensor. The counter 12 may also count the transport vehicle 20 that has passed through the entering route 46*a* based on positional information received from the transport vehicle 20.

Figure 6:
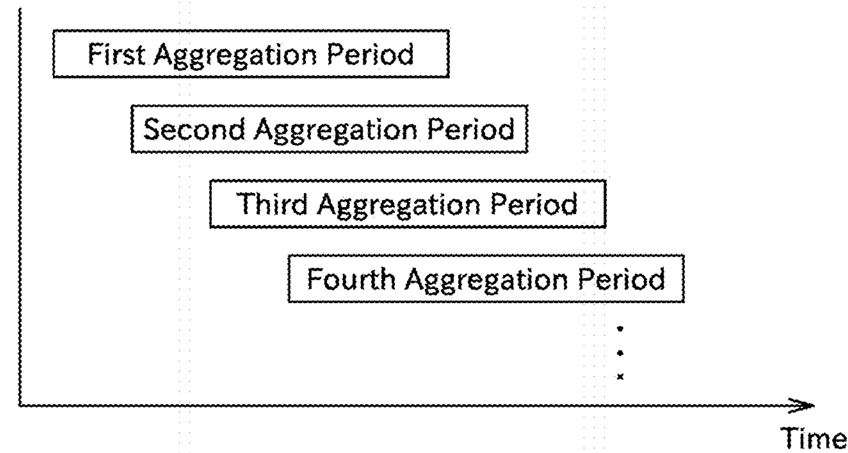
FIG. 6 is a time chart illustrating aggregated time of the number of counts.

Next, the management controller 10 determines whether an aggregation period has passed (S102). The aggregation period is a period to count the number of transport vehicles 20 entering the setting area. In the present example embodiment, as illustrated in FIG. 6, the aggregation period is set. The aggregation period is a predetermined period (for example, a few minutes), and the aggregation period is updated appropriately. As illustrated in FIG. 6, parts of two temporally adjacent aggregation periods overlap in time. For example, a portion of a first aggregation period and a portion of a second aggregation period overlap in time. Such aggregation period is just an example; for example, each aggregation period does not need to overlap in time.

When the management controller 10 determines that the aggregation period has not passed, counting of the transport vehicle 20 continues until the aggregation period has elapsed. When the aggregation period has elapsed, the management controller 10 determines whether a count aggregation value in the aggregation period exceeds a first threshold (S103). The count aggregation value is a value in which the number of counts in the aggregation period is aggregated. The count aggregation value is, for example, a total number of counts in the aggregation period, but may be a time average value of the number of counts in the aggregation period. The aggregation may be performed by giving greater weight to the number of counts as the time period is closer to the current time.

The count aggregation value is a value related to the congestion in the setting area from past to present. Therefore, compared to a value related to the congestion at one point in time, the count aggregation value may represent a congestion status more accurately. For example, even when the setting area is congested at a certain point in time and when the count aggregation value is small, it is highly likely that the congestion in the setting area is starting to be resolved. Thus, by using the count aggregation value, the current and near future congestion status of the setting area can be determined more accurately.

The first threshold is determined in various ways, and, for example, the following method may be determined. That is, in experiments, simulations, or actual operations, the correlation between the count aggregation value and the congestion status of the setting area can be obtained, and the first threshold can be determined based on the count aggregation value that corresponds to a highly congested status in the setting area.

When the management controller 10 determines that the count aggregation value in the aggregation period exceeds the first threshold, the management controller 10 determines whether the number of transport vehicles 20 located in the setting area exceeds the second threshold (S104). The management controller 10 can identify the transport vehicle 20 located in the setting area by the same method as in Step S101. The second threshold is a threshold to determine whether the setting area is congested at the moment. Therefore, the second threshold is set to, for example, the number of transport vehicles 20 or a certain smaller number than such number of transport vehicles 20 when the setting area is congested to the extent that the speed of the transport vehicle 20 traveling in the setting area decreases. At least one of the first threshold and the second threshold may be changeable by a user or a provider of the transport system 1. The determination using the second threshold is auxiliary, and may be omitted.

The adjuster 13 of each of the management controllers 10 sets a cost of a route entering the setting area (for example, the entering route 46*a*) to "High" when it is determined that the threshold has been exceeded in both Step S103 and Step S104 (S105). In the present example embodiment, the cost of the route entering the setting area has two levels: "Normal", and "High" which is higher than "Normal". Therefore, the cost increases when the cost is "Normal" and is then changed to "High". This increases the cost of the route passing through the setting area.

When the management controller 10 determines that the value is below the threshold in at least either Step S103 or Step S104, the adjuster 13 sets the cost of the route entering the setting area to "Normal" (S106). That is, when the congestion in the setting area has resolved (or when there are signs of resolution), the cost of the route returns from "High" to "Normal".

The adjuster 13 may change the cost of the route in the setting area, instead of the change of the cost of the route entering the setting area. Even when any cost is changed, the cost of the route passing through the setting area increases. Thus, the number of transport vehicles 20 traveling in the setting area can be changed.

The management controller 10 notifies the cost change when the cost is changed in Step S105 and Step S106 (S107). Specifically, the management controller 10 notifies all the transport vehicles 20 managed by the management controller 10 of the cost change. Then, the management controller 10 notifies other management controllers 10 of the cost change. After that, other management controllers 10 notify the transport vehicles 20 managed by other management controllers 10 respectively, of the cost change. A notification method is just an example; for example, all management controllers 10 may be notified via an upper control device. Alternatively, when the transport vehicles 20 need not remember the cost, the notification of the cost may be omitted. After that, the management controller 10 moves to a next aggregation period (S108), and performs processes from Step S101 to Step S107 again.

Figure 7:
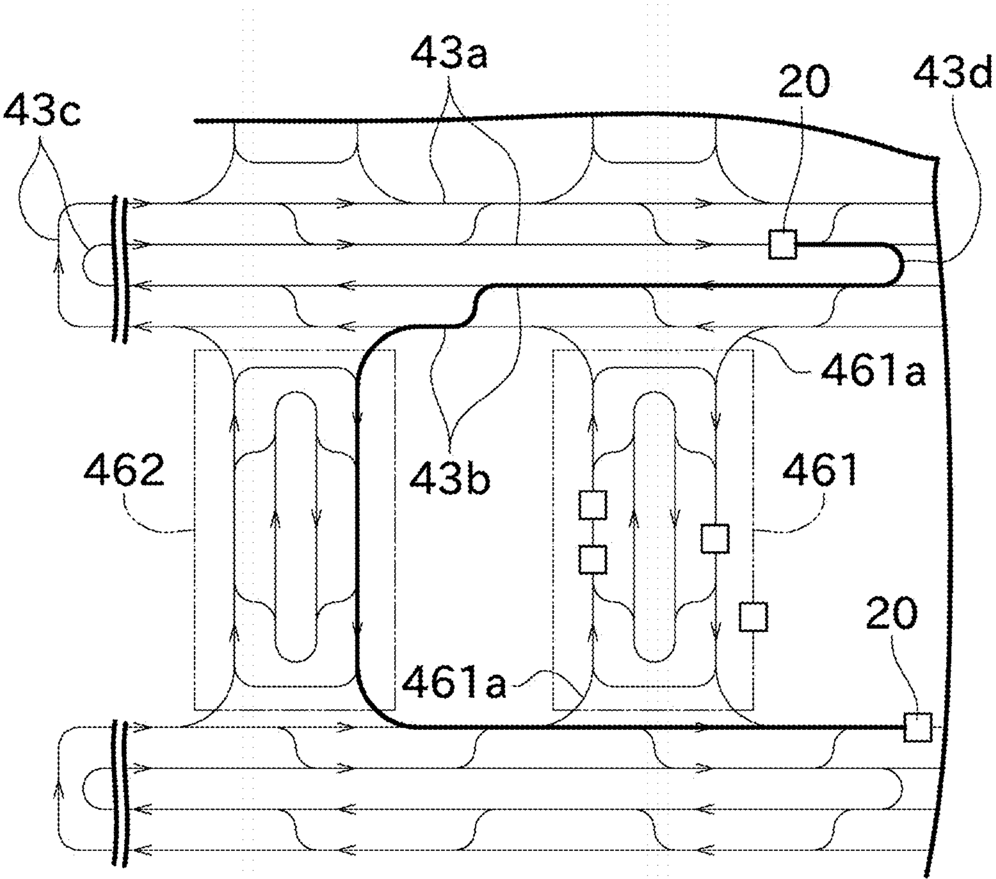
FIG. 7 is a schematic plan view illustrating a route on which the transport vehicle travels after the process in which the congestion is reduced.

In the following, an influence when the cost is changed from "Normal" to "High" will be described. For example, as illustrated in FIG. 7, a case in which a second processing area 461 and a second processing area 462 exist and a cost of an entering route 461*a* entering the second processing area 461 is changed from "Normal" to "High" will be considered. In this case, the cost is high when the entering route 461*a* is selected. Thus, the route selector 11 selects a route without passing through the entering route 461*a* even when it is a detour. In an example illustrated in FIG. 7, a route passing through the second processing area 462 is selected instead of the second processing area 461.

However, when a destination of the transport vehicle 20 is the second processing area 461, the transport vehicle 20 cannot reach the second processing area 461 without passing through the entering route 461*a*. Therefore, the route selector 11 selects the route passing through the entering route 461*a*.

When the route passing through the entering route 461*a* has been already set at a time of reception of a notification in which the cost has been changed from "Normal" to "High", the route selector 11 may determine whether the route is changed to another route without passing through the entering route 461*a* in time. This can reduce the congestion in the second processing area 461 even earlier.

As described above, the transport system 1 of the present example embodiment includes the transport vehicles 20 and the management controllers 10. Each of the transport vehicles 20 travels along the trajectory 30 to transport the article 40. Each of the management controllers 10 assigns the transport command of the article 40 to the transport vehicles 20. The transport system 1 of the present example embodiment includes the route selector 11, the counter 12, and the adjuster 13. The route selector 11 selects the route on which the transport vehicle 20 travels, based on the transport command, such that the cost of the route from the departure point to the destination is reduced or minimized. The counter 12 counts the number of transport vehicles 20 entering the setting area that is set in the trajectory 30. The adjuster 13 increases the cost of the route passing through the setting area when the count aggregation value in which the number of counts counted by the counter 12 in the aggregation period is aggregated exceeds the first threshold.

The count aggregation value is data regarding the congestion from the past to the point of aggregation, and is therefore an effective indicator of occurrence of the congestion of the transport vehicles 20. Thus, the cost of passing through the route increases based on the count aggregation value, which allows the congestion status to be accurately determined and the congestion of the transport vehicles 20 to be reduced.

In the transport system 1 of the present example embodiment, the adjuster 13 determines whether the count aggregation value in the first aggregation period exceeds the first threshold, and then determines whether the count aggregation value in the second aggregation period exceeds the threshold. A portion of the first aggregation period and a portion of the second aggregation period overlap temporally.

Accordingly, the change in the congestion status of the transport vehicles 20 can be detected earlier, as compared with when the first aggregation period and the second aggregation period do not overlap temporally.

In the transport system 1 of the present example embodiment, the adjuster 13 increases the cost of the route passing through the setting area when the count aggregation value exceeds the first threshold and the number of transport vehicles 20 located in the setting area exceeds the second threshold.

Accordingly, a determination can be performed in further consideration of the current congestion status. This can determine the congestion status more accurately and reduce the congestion of the transport vehicles 20.

In the transport system 1 of the present example embodiment, the plurality of setting areas is set. The counter 12 counts the number of transport vehicles 20 entering the setting area for each setting area.

Thus, the congestion can be reduced in a plurality of locations. When the cost of the route passing through a certain setting area increases and, as a result, when another setting area is congested, the congestion in such newly congested setting area can be reduced.

In the transport system 1 of the present example embodiment, the processor 91 is located along the trajectory 30. The processor 91 processes the article 40 transported by the transport vehicle 20. An area formed by the trajectory 30 includes the processing area and the connection area. The processing area is an area where the processor 91 is located. The connection area connects processing areas. The setting area includes at least a portion of the processing area. The counter 12 counts the number of transport vehicles 20 entering the setting area from the connection area.

Since it is assumed that a large number of transport vehicles 20 travel in the connection area, the congestion is likely to occur as the number of transport vehicles 20 entering the setting area from the connection area increases. Thus, the counting of the number of transport vehicles 20 as above can reduce the congestion.

In the transport system 1 of the present example embodiment, the connection area includes the first track 43*a*, the second track 43*b*, the connection paths 43*c*, and the shortcut 43*d*. The second track 43*b* is parallel or substantially parallel to the first track 43*a*. Each of the connection paths 43*c* connects an end of the first track 43*a* and an end of the second track 43*b* on the same side. The shortcut 43*d* is provided separately from the connection paths 43*c*, and connects the intermediate portion of the first track 43*a* and the intermediate portion of the second track 43*b*. The setting area includes at least a portion of the processing area closest to the shortcut 43*d* in the plurality of processing areas.

Due to the existence of the shortcut 43*d*, the number of transport vehicles 20 passing through the shortcut 43*d* increases, resulting in unbalance in the trajectory on which the transport vehicles 20 travel. Accordingly, the congestion is more likely to occur, which effectively utilizes a function of congestion reduction.

In the transport system 1 of the present example embodiment, the connection area includes the intermediate connection area 43, the first connection area 41, and the second connection area 42. The intermediate connection area 43 includes the first track 43*a*, the second track 43*b*, the connection paths 43*c*, and the shortcut 43*d*. The first connection area 41 is located on the first side, and the second connection area 42 is located on the second side opposite to the first side, with the intermediate connection area 43 interposed therebetween in the plan view. The processing area includes the plurality of first processing areas 45 and the plurality of second processing areas 46. The first processing area 45 is connected to the first connection area 41, and the first track 43*a* of the intermediate connection area 43. The second processing area 46 is connected to the second connection area 42, and the second track 43*b* of the intermediate connection area 43. The setting area includes at least one first processing area 45 closest to the shortcut 43*d*, and at least one second processing area 46 closest to the shortcut 43*d*.

Since the transport vehicle 20 traveling from the first connection area 41 to the second connection area 42 mainly passes through the shortcut and the processing areas near the shortcut, the congestion is likely to occur in such processing areas. Therefore, these processing areas are included in the setting area, which can reduce the congestion appropriately.

Although example embodiments of the present invention have been described as above, the above-described configurations may be modified as follows, for example.

In the above-described example embodiments, the route selector 11, the counter 12, and the adjuster 13 are provided in the management controller 10. Alternatively, at least one of these components may be provided in the transport vehicle 20 (transport controller 21). That is, the management controller 10 or the transport vehicle 20 may configured or programmed to perform a process of congestion determination and reduction.

In the above-described example embodiments, the area is divided into the connection area and the processing area, and the processing area is defined as the setting area, however, the setting area of the above-described example embodiment is an example. For example, the connection area may be set as the setting area, and a portion of the processing area or a portion of the connection area may be set as the setting area. The trajectory 30 and the processor 91 may be located so as not to be clearly divided into the connection area and the processing area.

As described above, the layout of the trajectory 30 is an example, and the layout is not limited to that of the above-described example embodiment. For example, a layout in which the plurality of processing areas are connected to each other by a plurality of tracks (connection areas) may be acceptable. In this case, when one track is congested, the cost of such track increases and another track is used preferentially.

A flowchart illustrating the above-described example embodiments is an example. A portion of the process may be omitted, a portion of the process details may be modified, and a new process may be added.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport system including a plurality of transport vehicles, the transport system comprising:

a first transport vehicle to travel along a trajectory to transport an article; and a management controller configured or programmed to assign a transport command of the article to the first transport vehicle and to include:

a route selector configured or programmed to select, based on the transport command, a route on which the first transport vehicle travels such that a cost of the route from a departure point to a destination is reduced or minimized;

a counter configured or programmed to count each of the plurality of transport vehicles that passes through an entering route to a setting area in the trajectory to determine a total number of transport vehicles entering the setting area in the trajectory; and an adjuster configured or programmed to increase a cost of a route passing through the setting area when a count aggregation value in which the total number of the transport vehicles counted by the counter in an aggregation period is aggregated exceeds a first threshold.

2. The transport system according to claim 1, wherein the adjuster is configured or programmed to determine whether the count aggregation value in a first aggregation period exceeds the first threshold, and then determine whether the count aggregation value in a second aggregation period exceeds a threshold; and a portion of the first aggregation period and a portion of the second aggregation period overlap temporally.

3. The transport system according to claim 1, wherein the adjuster is configured or programmed to increase the cost of the route passing through the setting area when the count aggregation value exceeds the first threshold and when the total number of transport vehicles located in the setting area exceeds a second threshold.

4. The transport system according to claim 1, wherein a plurality of the setting areas is set; and the counter counts the total number of transport vehicles entering the setting areas for each setting area.

5. The transport system according to claim 1, wherein a processor is located along the trajectory to process the article transported by the first transport vehicle;

an area included in the trajectory includes:

a processing area in which the processor is located; and a connection area connecting the processing area and another processing area;

the setting area includes at least a portion of the processing area; and the counter is configured or programmed to count the total number of transport vehicles entering the setting area from the connection area.

6. The transport system according to claim 5, wherein the connection area includes:

a first track;

a second track parallel or substantially parallel to the first track;

a connection path connecting an end of the first track and an end of the second track on the same side; and a shortcut that is separate from the connection path and connects an intermediate portion of the first track and an intermediate portion of the second track; and the setting area includes at least a portion of the processing area closest to the shortcut in a plurality of the processing areas.

7. The transport system according to claim 6, wherein the connection area includes:

an intermediate connection area including the first track, the second track, the connection path, and the shortcut; and a first connection area located on a first side, and a second connection area located on a second side opposite to the first side with the intermediate connection area interposed between the first connection area and the second connection area in a plan view;

the processing area includes:

a plurality of first processing areas connected to the first connection area and connected to the first track of the intermediate connection area; and a plurality of second processing areas connected to the second connection area and connected to the second track of the intermediate connection area; and the setting area includes at least one of the first processing areas closest to the shortcut and at least one of the second processing areas closest to the shortcut.

* * * * *